United States Patent [19]

Dzwinel

[11] Patent Number: 4,628,266

[45] Date of Patent: Dec. 9, 1986

[54] APPARATUS FOR DIRECT AIRBORNE ELECTROMAGNETIC PROSPECTING OF HYDROCARBON DEPOSITS.

[75] Inventor: Jan Dzwinel, Krakow, Poland

[73] Assignee: Instytut Gornictwa Naftowego, Krakow, Poland

[21] Appl. No.: 693,002

[22] Filed: Jan. 17, 1985

Related U.S. Application Data

[62] Division of Ser. No. 385,228, Jun. 4, 1982.

[30] Foreign Application Priority Data

Jun. 10, 1981 [PL] Poland ................................. 231633

[51] Int. Cl.$^4$ .......................... G01V 3/165; G01V 3/16
[52] U.S. Cl. ...................................... 324/330; 324/334
[58] Field of Search ................ 324/330, 331, 334, 335

[56] References Cited

U.S. PATENT DOCUMENTS

| | | | |
|---|---|---|---|
| 2,929,984 | 3/1960 | Puranen et al. | 324/330 X |
| 2,931,973 | 4/1960 | Puranen et al. | 324/330 X |
| 3,123,766 | 3/1964 | Ruddock | 324/330 |
| 3,538,428 | 11/1970 | Barringer | 324/330 |
| 3,604,660 | 9/1971 | Marley | 324/331 X |
| 3,663,953 | 5/1972 | Salvi | 324/331 X |
| 3,936,728 | 2/1976 | Ghosh et al. | 324/335 |
| 3,950,695 | 4/1976 | Barringer | 324/334 |
| 4,258,322 | 3/1981 | Rocroi et al. | 324/335 |
| 4,367,439 | 1/1983 | Fraser | 324/330 |

FOREIGN PATENT DOCUMENTS

| | | | |
|---|---|---|---|
| 1188363 | 6/1985 | Canada . | |
| 270123 | 8/1970 | U.S.S.R. | 324/330 |
| 603935 | 5/1978 | U.S.S.R. | 324/330 |

OTHER PUBLICATIONS

Tarchov, A.G., Electrorazwedka-Sprawocnik Geofizika; "Nedra", Moskva 1980, pp. 164–167, 169, 214–216.

Primary Examiner—Gerard R. Strecker
Attorney, Agent, or Firm—Ladas & Parry

[57] ABSTRACT

An apparatus for direct airborne electromagnetic prospecting of hydrocarbons by transmitting many primary electromagnetic fields and detecting any deviation of the primary electromagnetic fields due to secondary electromagnetic fields. The transmitting and detecting operations are carried out first over a known area, as a stage of system instruction, and then over an unknown area, as a stage of actual prospecting. A transmitting system, suspended vertically from a helicopter, is adapted to radiate electromagnetic fields of many different frequencies and many different orientations controlled automatically. A receiving system, suspended vertically from the transmitting system, is adapted to detect signals of three orthogonal components of electromagnetic deviations as a function of helicopter altitude, frequency, transmitter loop orientation and receiver antenna orientation. Also a processing system is provided to store and process an enormous volume of data directly into probability levels of hydrocarbon presence or absence over the area explored.

1 Claim, 2 Drawing Figures

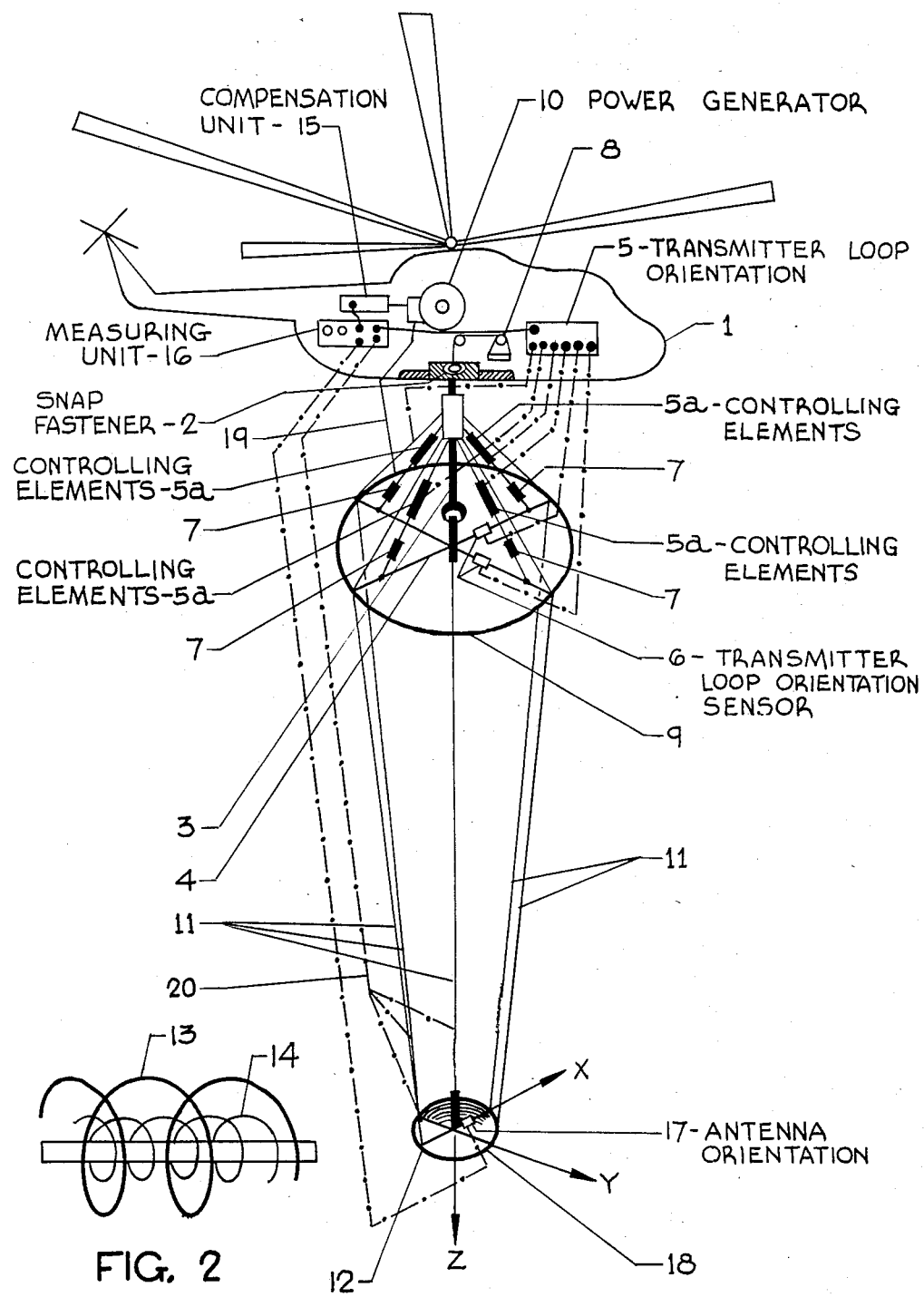

APPARATUS FOR DIRECT AIRBORNE ELECTROMAGNETIC PROSPECTING OF HYDROCARBON DEPOSITS.

CROSS-REFERENCE TO RELATED APPLICATION

This is a divisional application of co-pending application, Ser. No. 385,228 filed June 4, 1982.

BACKGROUND OF THE INVENTION

The present invention relates to an apparatus for direct airborne electromagnetic prospecting of hydrocarbons; for example, oil and gas deposits.

Specifically, it relates to an improved geophysical surveying system for transmitting and receiving many electromagnetic signals of varying frequency and orientation. The transmitting operation is carried out over several hundred combinations of transmitting system characteristics: helicopter altitude, electromagnetic field frequency and transmitter loop inclination and direction. The receiving operation multiplies the number of these combinations as two parameters, amplitude and phase, of three orthogonal electromagnetic field components $H_x$, $H_y$, $H_z$, are measured by the receiving system. The transmitting and receiving operations are carried out first over a known area (a stage of system instruction) and then over an unknown area (a stage of actual prospecting). Moreover, a data processing system is provided that converts electronically the measured results directly into hydrocarbon occurrence probability levels on the basis of pattern recognition theory.

DESCRIPTION OF PRIOR ART

There are many known arrangements for the purpose of airborne electromagnetic prospecting used mainly in the search for ore deposits. In practice, all these devices have failed to produce diagnostic results in hydrocarbon prospecting as they have serious difficulties in distinguishing between "desired" anomalies arising from commercial hydrocarbon deposits and "undesired" anomalies caused by commercially unimportant geological structures.

All known devices for airborne electromagnetic prospecting are based on the principle that if a cyclically alternating or otherwise varying electromagnetic field (referred to as a "primary field") is radiated over an area, the primary field normally penetrates the earth's surface and links with any electrically conductive bodies in the subsurface. Primary fields are radiated by passing an alternating current through an induction transmitter loop or coil. When the electromagnetic flux of a primary field links with a body of electrically conductive material, eddy currents are generated in the body and the resulting eddy currents radiate a secondary electromagnetic field which is of the same frequency as the primary field. Generally the secondary field is somewhat out of phase with the primary field. When an out-of-phase secondary field radiates into the primary field, the resulting field is distorted. As electrically conductive bodies have special resistivity and induction characteristics, the phase-shift type distortions of the resulting electromagnetic fields over the area can be indicative of the location and of the important geological characteristics of subsurface bodies. The distortions of the resulting electromagnetic fields are detected with induction receiver loops or coils. Localized subterranean zones or bodies that have abnormal electrical conductivity characteristics are referred to as "anomalies".

Thus, a geophysical system comprising a transmitter loop and receiver coils is installed on a helicopter flying along a predetermined measuring profile.

The electric signals that are generated in the receiver coils from distorted electromagnetic fields are fed to additional receiver apparatuses and analyzed for indications of important geological anomalies. The analysis consists in obtaining a model of the sub-surface. Because of very long computation times required for processing the results, manual data analysis is used in practice.

Various devices for carrying out the above described operations already exist. Among these devices, that described in U.S. Pat. No. 3,123,766 relates to an apparatus for towing a light weight stabilized truss which is fixed horizontally beneath a helicopter. On opposite ends of the truss, a transmitter coil and receiver coil are provided for the purpose of locating conductive bodies. The horizontally placed coils operate at frequencies within an acoustic band of 30 to 3,000 Hz.

U.S. Pat. No. 3,538,428 relates to a structure for towing beneath a helicopter in a horizontal relatively light and stabilized tubular structure, the ends of which have mounted therein the transmitter and receiver coils with relative orientation stabilized by a taut wire construction.

U.S. Pat. No. 3,604,660 relates to an apparatus including induction loops on a load platform beneath a helicopter. The load platform is carried horizontally on a gyro-stabilized gimballed suspension. The platform position is stabilized by gyro-controlled drive means.

In all said references, the transmitter and receiver coils are positioned in planes which may be orthogonal or parallel to each other. Common features appear to include the following. A light weight rigid construction is used for horizontal mounting of the coil. The construction is mounted between the body and skids of the helicopter. The construction, including the coils, is stabilized in a horizontal position. The lightweight transmitter and receiver coils are rigidly fixed at opposite ends of the construction and the coils for supplying and receiving signals are designed for low power electromagnetic fields and for acoustic frequencies commonly used in prospecting for ore deposits.

U.S. Pat. No. 3,936,728 provides for a system with transmitter and receiver coils located at constant spacing and designed for acoustic frequencies within a range of from about 5 to 43,000 Hz with the coils spaced from 2,000 to 3,000 yards to carry out a depth of search of about one-half mile.

U.S.S.R. Pat. No. 270,123 relates to a transmitter coil construction rigidly mounted on a helicopter. A direct current source is used and strobed square pulsed are generated so the variation of electromagnetic field as a function of time is measured with a receiver antenna.

U.S.S.R Pat. No. 603,935 also relates to a transmitter coil construction rigidly mounted on a helicopter fuselage, while the receiver coil is towed in a gondola beneath the helicopter. The transmitter coil supply signals and electromagnetic field measurements are performed using pulses of from 3 to 100 Hz frequency and also by voltage pulses. As in the case of the other prior art, the Soviet devices utilize a transmitter coil rigidly mounted on the helicopter body, and the electromagnetic field is varied over a period of time to prospect for ore deposits.

U.S. Pat. No. 4,258,322 concerns sub-soil prospecting using electromagnetic methods in which transmitter and receiver coils are spaced apart and the distance between them is varied in parallel to the sub-soil layers being surveyed. Magnetic field strength is observed and a sub-soil model is determined for comparison purposes.

U.S. Pat. No. 4,367,439 concerns geophysical surveying with two or three rigidly spaced transmitter-receiver coil-pairs. The transmitter coils of said pairs are energized at frequencies which are different but closely spaced. The apparatus is designed for differentiating anomalies caused by thin and thick steeply dipping conductive layers e.g. ore bodies. The results obtained may be plotted and analyzed visually.

Summarizing, the prior art electromagnetic prospecting systems include a transmitter loop mounted in a fixed position on the helicopter flying generally at one altitude. The transmitter loop is generally energized at acoustic frequencies and very few frequency values are employed. Very low transmitting energy is employed up to 2.5 kW. Only one or two induction receiver loops are employed; in general one parallel to the plane of the transmitter loop and the other perpendicular to the plane of this transmitter loop. The prior art apparatuses are used successfully in ore prospecting but have serious difficulties in distinguishing between anomalies arising from commercial hydrocarbon deposits and other anomalies. Moreover, receiver loops often measure undesired "noise" from extraneous electromagnetic fields or other causes, causing additional problems of discriminating between noise and desired signals. The prior art airborne electromagnetic devices are ineffective in hydrocarbon prospecting as the electrokinetic influence of the electrical structure of pore spaces of rock containing hydrocarbons on the measured electromagnetic field cannot be employed. This is because of the low electrical relaxation time constant of such an electrical structure in relation to the frequencies employed.

In practice, the prior art devices are not suitable for hydrocarbon prospecting as the effects of hydrocarbons on the electrical characteristics of rocks are very difficult to separate from other effects due to structure or near surface inhomogeneities. To distinguish between the effects of hydrocarbons and other effects requires an apparatus providing deeper electromagnetic penetration as well as the measurement of many more parameters than is possible with prior art airborne electromagnetic devices.

Prior apparatuses for electromagnetic prospecting have a limited prospecting depth range, typically 100 to 300 meters beneath the surface of land or water due to the well known fact that electromagnetic wave absorption by rocks rapidly increases with depth for the frequency range these prior apparatuses employ.

Another disadvantage of previous devices is that very little information is produced during electromagnetic surveying. Only a single or few electromagnetic field patterns, very few frequencies, and few changes in field direction and the field's electromagnetic components are employed. Such little information is generally ambiguous and cannot be suitably processed to produce diagnostic results in petroleum prospecting. In practice, the only mathematical tool used in the data analysis is preconceived sub-soil modelling curves to which the results obtained are fitted manually by an interpreter.

Prior art devices do not provide for complete automatic data interpretation and the prospecting process is completed by an interpreter utilizing mainly his subjective ability and additional subjectively chosen geological information. As a final result, only the presence or absence of conductive layers may be determined, but geological classification of these layers cannot be established directly. Geologic classification is based on the subjective knowledge and experience of the interpreter.

Thus, the prior art apparatuses for airborne electromagnetic prospecting do not have the power to acquire and interpret the quantities of data required to be truly diagnostic in petroleum prospecting.

There is a longstanding need for an apparatus using much greater power to acquire and interpret hundreds of times more data than prior art apparatuses are capable of. Although the geophysical art attempted, for many years, to overcome the foregoing difficulties, none, insofar as we are aware, has been entirely successful in practice on a commercial petroleum prospecting scale.

SUMMARY OF THE INVENTION

It should be noted that the invention is applicable to the methods of direct airborne electromagnetic prospecting of hydrocarbon deposits, like that described in pending U.S. Patent application Ser. No. 385,228 assigned to the assignee of the present invention.

The object of the present invention is to provide an apparatus to directly determine the probability of hydrocarbon occurrence with good accuracy and reasonable measuring time. To this end, the invention provides:

1. A transmitting system suspended vertically from a helicopter and adapted to radiate many electromagnetic fields of many different frequencies and many different orientations controlled automatically;

2. A receiving system suspended vertically from the transmitting system and adapted to detect the signals of three orthogonal components of electromagnetic deviations as a function of helicopter altitude, frequency, transmitter loop orientation and receiver antenna orientation; and 3. A processing system installed on a helicopter board to store and process an enormous volume of data, and which provides a probability level of hydrocarbon presence or absence over the explored area.

BRIEF DESCRIPTION OF THE DRAWINGS

The invention will be now described in conjunction with the attached drawings.

FIG. 1 is a diagram of the airborne apparatus for direct electromagnetic prospecting of hydrocarbon deposits; and FIG. 2 is a diagram of an induction antenna.

DESCRIPTION OF PREFERRED EMBODIMENTS

The invention will be better understood from the following description of a particular embodiment with reference to the method for direct airborne electromagnetic prospecting of hydrocarbon deposits as described in U.S. patent application Ser No. 385,228.

According to the invention, the helicopter is equipped with an electromagnetic assembly comprising a transmitter system, a receiving system and a processing system.

The transmitting operation is carried out at several hundred combinations of transmitting system characteristics: helicopter altitude, electromagnetic field frequency and transmitter loop inclination and direction. The receiving operation multiplies the number of these combinations as two parameters, amplitude and phase, of three orthogonal electromagnetic field components $H_x$, $H_y$, $H_z$ are measured by the receiving system. The transmitting and detecting operations are carried out first over a known area (a stage of system instruction) and then over an unknown area (a stage of actual prospecting). The data processing system converts electronically the measured results directly into hydrocarbon occurrence probability levels on the basis of pattern recognition theory. In the stage of system instruction, the multidimensional patterns of known petroleum reservoirs and known barren locations are determined as vectors composed of phase and amplitude values obtained over numerous combinations of the above mentioned characteristics. In the stage of actual prospecting, the patterns obtained for points over an unknown area are compared electronically with the patterns determined for points over a known area, and the hydrocarbon occurrence probability value is obtained for each point over the unknown area on the basis of similarity between patterns.

A transmitting system, with reference to FIG. 1, consists of a high power induction transmitter loop 9 energized by a power generator 10 with alternating current through a supply cable 19. Six signals of different frequencies within the 0.1–10 Hz frequency range, e.g. 0.25–0.5–1–2–4–8 Hz, are sent from the power generator 10 to the transmitter loop 9. Transmitter loop 9 is made of a large number of turns of an insulated single conductor. The loop is suspended vertically from a helicopter 1 by means of snap fastener 2, a shaft 3 with an articulated joint and a supporting frame 4. Snap fastener 2 enables the transmitting system to be attached to and detached from a hovering helicopter as the helicopter cannot land or start with the equipment attached, and to be disconnected immediately in the case of an emergency. Shaft 3 serves to tow the frame 4 with transmitter loop 9, while its articulated joint enables the frame and loop to be oriented in any direction and at any angle. Supporting frame 4 is made of two crossed bars, to which ends transmitter loop 9 is mounted rigidly. The whole transmitting system, excluding power generator 10 that is installed on the helicopter board, may be also suspended from an electric winch 8 for manipulating the system during helicopter take off and landing.

The transmitting system contains also an assembly for controlling the orientation of transmitter loop 9 and supporting frame 4. The orientation controlling assembly consists of transmitter loop orientation controller 5', plurality of controlling elements 5, and plurality of transmitter loop orientation sensors 6, shock absorbers 7 and cables. The orientation of transmitter loop 9, i.e its direction and inclination angle, is predetermined by the operator for all the surveying flights. A suitable signal is sent from a measuring unit 16 that controls the whole apparatus to the controller 5' which in turn sends appropriate signals to controlling elements 5. Controlling elements 5 are mounted together with shock absorbers 7 in arms between the shaft 3 and supporting frame 4. Actuated controlling elements 5 cause the supporting frame 4 and transmitter loop 9 to incline at a predetermined angle in a predetermined direction. As actual orientation may differ from that predetermined, orientation sensors 6 are provided, mounted in the bars of supporting frame 4. The signals from sensors 6 are sent to controller 5' through the suitable cables, and new controlling signals are fed from controller 5' to controlling elements 5. Thus, the assembly for controlling the transmitter loop orientation acts in a feedback mode. The signal representing the stabilized loop orientation is sent to the measuring unit 16 as a principal characteristic of the transmitting system. Typical controlling and sensing elements may be used known to those skilled in the art. For example, aircraft type attitude sensors (orientation sensors 6) generate signals that are passed on to controller 5', which integrates the signals and automatically activates servo-controlled motors (controlling elements 5) to adjust the orientation of the transmitter loop 9.

A receiving system, with reference to FIGS. 1 and 2, consists of three orthogonal induction receiver antennae 12, compensation assembly and cables. Each induction antenna 12, with reference to FIG. 2, consists of induction receiver circuit 13 and compensation circuit 14, both wound on a permalloy core. The receiver antennae 12 are suspended vertically from the supporting frame 4 by means of steel lines 11 and provided with a horizontal aerodynamic shield 18. The receiver circuits 13 receive the deviations of three components $H_x$, $H_y$, $H_Z$ of the electromagnetic fields radiated by the transmitter loop 9. The amplitude and phase signals measured by the antennae are first compensated and then sent to the measuring unit 16 by means of measuring cable 20. The compensation assembly consists of compensation unit 15 and compensation circuits 14 within the antennae 12.

The compensation procedure is described in pending U.S. patent application Ser. No. 385,228. At the operator command given through measuring unit 16, when the helicopter is flying over a reference or compensation location, the compensation unit 15 sends to all three compensation circuits 14 such signals as to compensate completely the signals measured actually by the receiver circuits 13. Note that amplitude and phase signals measured by circuits 13 vary with helicopter altitude, frequency applied, transmitter loop orientation and receiver circuit number and position, so the compensating signals also have to vary. The compensating signals are fed to the measuring unit 16 where they are stored to be used in instruction and prospecting flights. Any time the measurement is carried out over an instruction or prospecting point, the amplitude and phase signals generated in receiver circuits 13 are compensated with the above mentioned compensating signal and then sent to the measuring unit to be stored and processed. The aerodynamic shield 18 may have various shapes and constructions; its role is to stabilize the orientation of antennae 12 while airborne. The orientation of antennae 12 and more particularly of receiver circuits 13 is sensed by sensors 17. The signals generated by the sensors 17 are also sent to the measuring unit as the principal data about the measuring system.

A processing system consists in measuring unit 16 that comprises:
digital meter assembly
microprocessor
magnetic memory, and
monitor and recorder The digital meter assembly measures amplitude and phase shift of compensated deviations as detected by receiver circuits 13 of antennae 12, direction and inclination of induction transmitter loop 9 as sensed by sensors 6, orientation of induction antennae 12 as sensed by sensors 17 as well as helicopter altitude and topographic position as sensed by helicopter instruments. A typical digital meter of suitable number of channels may be used.

Also a typical microprocessor with suitable software may be used. The microprocessor connected electronically with the transmitting and receiving systems as well as with meter assembly, magnetic memory, monitor, recorder and helicopter controlling instruments carries out the total prospecting process automatically i.e:

(a) actuates the transmitting system to radiate many primary electromagnetic fields over measuring points;
(b) actuates the receiving system to detect any deviation of amplitude and phase of all above mentioned fields over measuring points;
(c) gathers the following combined data separately for each measuring point:
  i. signal amplitude $a_{xy}$;
  ii. signal phase $\phi_{xy}$;
  iii. helicopter altitude "h";
  iv. frequency of primary electromagnetic field "i";
  v. direction and angle of transmitter loop inclination "j";
  vi. orientation of induction antennae "k"; and
  vii. horizontal co-ordinates "xy" of individual measuring points on a map;
(d) stores this data in the magnetic memory;
(e) processes this data directly into a hydrocarbon occurrence probability level for each measuring point over an unknown area on the basis of pattern recognition theory and in two stages—the system instruction stage and the actual prospecting stage; the processing procedure is described in pending U.S. patent application Ser. No. 385,228;
(f) shows immediately the probability of hydrocarbon presence or absence on a monitor as to enable the operator and helicopter pilot to change a helicopter route and examine carefully the detected potential petroleum reservoir; and
(g) plots a detailed map of probability contours over the total explored area.

If a suitable microprocessor is not available, a stationary computer may be employed located in a computing center. Should this be the case, the above listed data is stored airborne and processed after helicopter landing so the final probability results are obtained with some delay.

The present invention thus provides complex, multidimensional information on the deviations of primary electromagnetic fields due to secondary electromagnetic fields to be obtained, and converts this information directly into a probability level of hydrocarbon occurrence. Thus, the probability values of petroleum presence or absence are mapped in an accurate manner, which is of great importance to the accuracy of subsequent geophysical predictions and drilling decisions.

There are several important advantages of using the apparatus of this invention. These advantages include the following:

(a) A very large volume of information about the explored area is obtained. The data from each measuring point consists of several hundred amplitude and several hundred phase values that have been extracted from the receiver circuits by employing many combinations of (h,i,j,k) parameters during prospecting.
(b) Improved depth penetration is achieved. As the invented apparatus allows for a considerable increase in radiated power and reduction of the frequency of the transmitting system down to the range of 0.1–10 Hz, the possibility of prospecting to a depth of up to 5,000 meters is provided.
(c) Elimination of subjective geological and geophysical interpretation from data processing procedures is achieved. All data processing is carried out automatically, without an interpreter's participation, and drilling locations are determined directly by the microprocessor or computer.
(d) Ability to detect hydrocarbons directly in an accurate manner is provided. The complex, multiple electromagnetic fields provide the possibility of employing the electrokinetic effects occurring within rock pores containing hydrocarbons to detect deviations.
(e) Reduction or risk and cost associated with hydrocarbon exploration programs is achieved, as this invention may be substituted for such inconclusive, incomplete and often undiagnostic prospecting techniques as seismic and conventional electromagnetic surveys.
(f) Rapid prospecting under all conditions is possible. The values of hydrocarbon occurrence probability are determined in the course of flight, or with an insignificant delay for computer data processing if no processor of suitable quality is available. Prospecting may be carried out under conditions independent of the relief and other characteristics of the explored area, including bodies of water.

In a preferred embodiment of the invention, with reference to FIG. 1, a supporting frame 4 has a diameter of 6 meters, the induction transmitter loop 9 is made of 700 turns of an insulated single conductor and is supplied with an alternating current of up to 50 amperes. Three induction antennae 12 are independent and perpendicular to each other, and are suspended at a distance of 30 meters from the supporting frame 4.

In other embodiments of the apparatus according to the invention, the diameter of the supporting frame 4 may be from 2 meters up to 10 meters, the number of turns in the induction transmitter loop 9 may be from 200 to 1000, the amplitude of the alternating current supplying the loop 9 may range from 30 amperes to 100 amperes, and the distance between the induction transmitter loop 9 and the three induction antennae 12 can vary from 10 to 100 meters. Also, two concentric induction loops may be used so as to obtain superpositions of the electromagnetic fields and to reduce the number of flights. Moreover, the two horizontal receiver circuits 13 of the induction antennae 12 i.e. those which measure the horizontal components of the electromagnetic field and two corresponding induction compensation circuits 14, may be connected in series in order to minimize any requirement concerning the antennae 12 orientation in relation to the flight direction. The induction antennae 2 may be also suspended from one central steel line 11, while their "xy" plane orientation may be controlled by the measuring unit 16 through a variation of aerodynamic properties of the aerodynamic shield 18, such an orientation being sensed and measured by the sensor 17 and the measuring unit 16, respectively. In this case, the "k" variable may be adjusted when flying, and the volume of data used for hydrocarbon prospecting may be multiplied accordingly.

Other various modifications of the basic apparatus may also be used, including other frequency values within the 0.1-10 Hz band, other induction transmitter loop and receiver antennae configurations as well as other arrangements of the processing system.

What is claimed is:

1. A helicopter mounted apparatus for direct electromagnetic prospecting of hydrocarbon deposits comprising in combination a transmitting system, a receiving system, and a processing system, wherein:

(a) the transmitting system consists of a high power generator mounted on a helicopter board which supplies alternating current in the frequency range of 0.1 to 10 Hz through a supply cable to an induction transmitter loop consisting of a large number of windings of a single insulated conductor, (i) said transmitter loop being suspended vertically beneath the helicopter by means of a snap fastener, a shaft with an articulated joint, and a supporting frame, (ii) said shaft extending vertically below the helicopter and being connected to the helicopter via said snap fastener, and the lower end of said shaft being rigidly, orthogonally connected to said supporting frame, (iii) said supporting frame consisting of two crossed bars at whose ends said transmitter loop is rigidly connected, (iv) said articulated joint on said shaft enabling said frame and said transmitter loop to be oriented in any direction and at any angle, such orientation being achieved with a controlling assembly consisting of a transmitter loop orientation controller, controlling elements, loop orientation sensors, and shock absorbers, (v) said orientation controller mounted on the helicopter board and connected to a microprocessor also mounted on the helicopter board, said microprocessor controlling the entire apparatus and sending signals of predetermined orientation characteristics to said orientation controller, and said orientation controller in turn sending signals to said controlling elements, (vi) said controlling elements mounted on arms which connect the shaft to said support frame, and adjusting the relative length of said arms to obtain the desired orientation, (vii) said loop orientation sensors mounted on said supporting frame and continuously sending signals of the actual orientation back to said orientation controller, which in turn continuously adjusts the signal to the controlling elements, (viii) said shock absorbers being mounted on the arms connecting the shaft to said support frame, and (ix) the signal from said loop orientation sensors being sent to said microprocessor as one input to be stored;

(b) the receiving system consisting of three orthogonal induction receiver antennae each consisting of two circuits wound on a permalloy core, one a measuring circuit to measure the deviation of phase and amplitude of one of the three components $H_x$, $H_y$, $H_z$ of said primary electromagnetic fields, and the other a compensation circuit which is used to compensate for the deviation of phase and amplitude signals measured by said inducation receiver antennae over locations known not to contain hydrocarbons (reference locations), (i) said induction receiver antennae being rigidly attached to a horizontal aerodynamic shield, said aerodynamic shield stabilizing said induction receiver antennae while in flight and being suspended vertically from the transmitter loop supporting frame by means of steel lines, (ii) signals received by the induction receiver antennae over said reference locations for all combinations of transmitter induction loop orientation, frequency, and helicopter altitude being transmitted to the microprocessor via measuring cables and stored in magnetic storage controlled by said microprocessor, and when flights are performed over locations for which it is to be determined whether or not hydrocarbons occur (prospecting locations), signals being sent to the compensation circuits from said microprocessor to compensate for the signals previously obtained over said reference locations, and (iii) the orientation of said inducation receiver antennae being sensed by antennae orientation sensors mounted on one of said inducation receiver antennae, said antennae orientation sensors generating a signal which is sent via an additional measuring cable to said microprocessor and then stored on said magnetic storage;

(c) the processing system consisting of a digital meter assembly, a microprocessor, magnetic storage, and a monitor, (i) said digital meter assembly being located on the helicopter board and accepting as input the signals of the compensated phase and amplitude from said measuring circuits of said induction receiver antennae, the orientation of said induction transmitter loop as sensed by said loop orientation sensors, the orientation of said induction receiver antennae as sensed by said antennae orientation sensors, the helicopter altitude and geographic co-ordinates as measured by standard helicopter instruments, (ii) said microprocessor being located on the helicopter board and being linked electronically to the transmitting system, receiving system, and digital meter assembly, and controlling the generator output and the orientation of said transmitting induction loop, and (iii) said microprocessor also gathering and storing in said magnetic storage the signals of phase and amplitude from said measuring circuits of said induction receiver antennae, the helicopter altitude, the frequency of the signal supplied to said transmitting induction loop, the orientation of said induction receiver antennae, and the geographic co-ordinates of the helicopter, and (iv) said microprocessor processing this data to obtain a probability level of hydrocarbon occurrence over each said prospecting location on the basis of pattern recognition theory and displaying said probability level on said monitor located in the helicopter, or alternately, said processing being performed after the helicopter lands by a second microprocessor on the ground and plotting a map of probability contours from data obtained over all said prospecting locations.

* * * * *